July 20, 1943.  W. S. COBEN  2,324,996
VEHICLE TIRE
Filed July 10, 1941  3 Sheets-Sheet 1
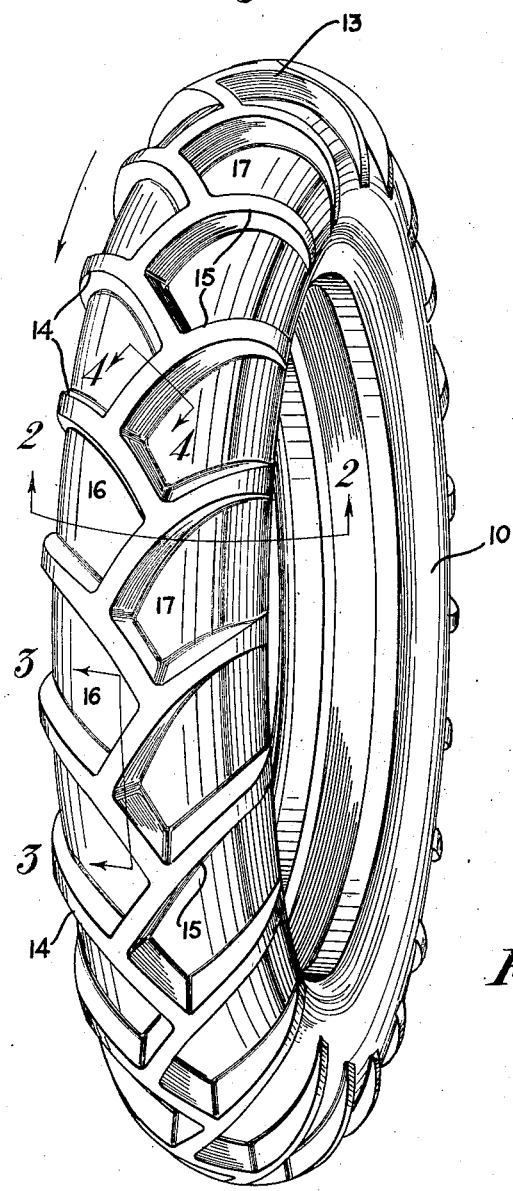
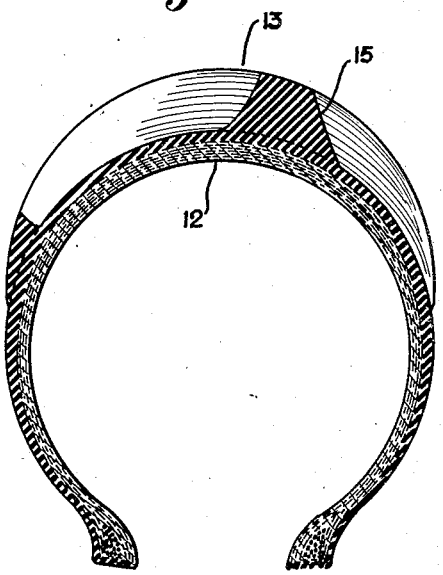
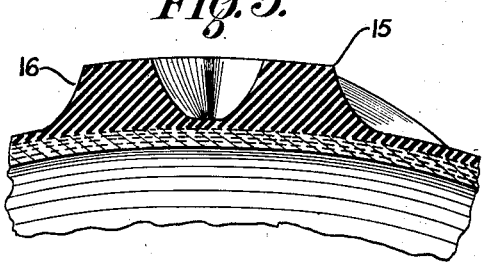
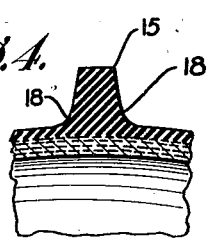
INVENTOR
William S. Coben
BY
ATTORNEYS

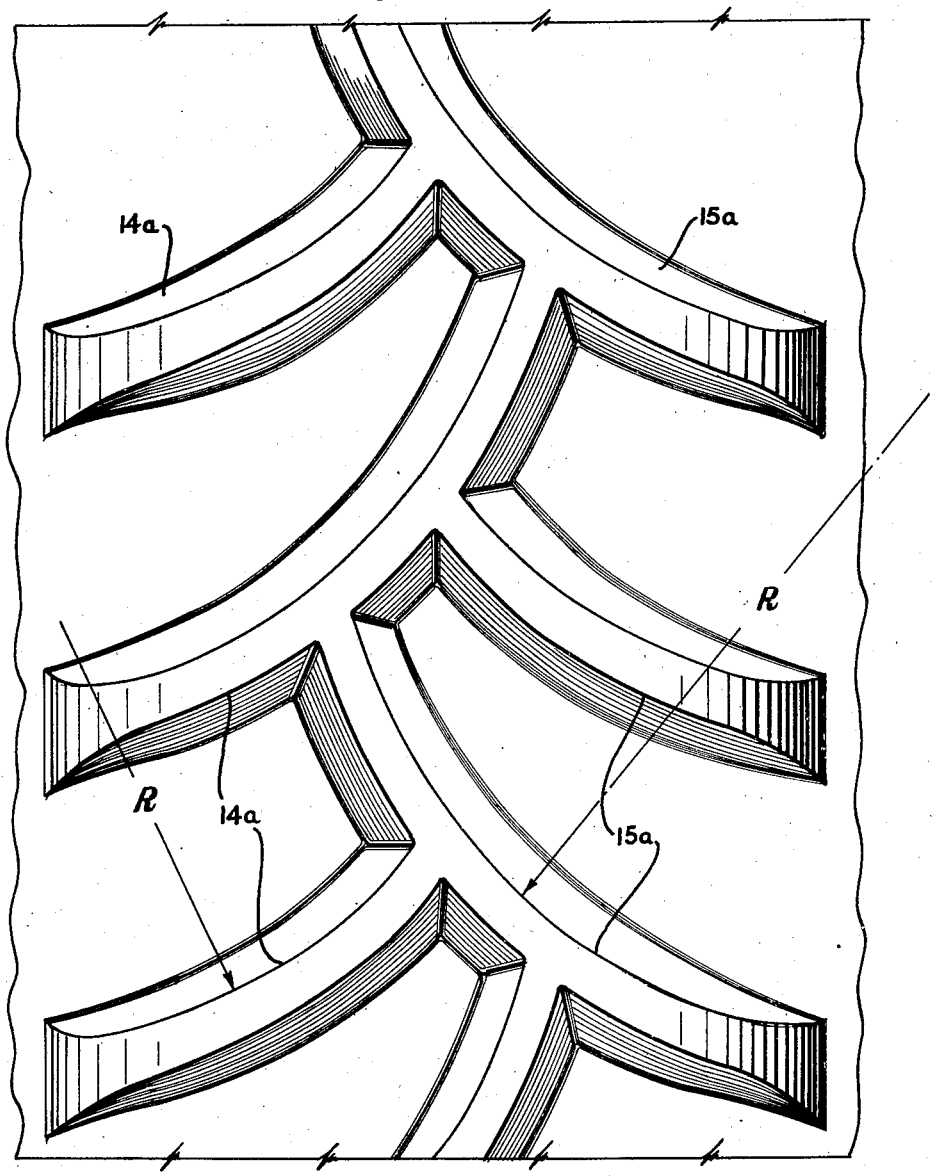

Patented July 20, 1943

2,324,996

UNITED STATES PATENT OFFICE 2,324,996

VEHICLE TIRE

William S. Coben, Akron, Ohio, assignor to The Firestone Tire & Rubber Company, Akron, Ohio, a corporation of Ohio Application July 10, 1941, Serial No. 401,717

5 Claims. (Cl. 152—209)

This invention relates to traction tires and refers particularly to agricultural tractor tires adapted to operate on readily deformable surfaces or soils having a large variation of texture and moisture content.

In a traction device, such as a wheel or tire adapted to operate in soft ground, it is essential that sufficient traction be obtained without dissipating a large amount of the power developed by the motor of the tractor. Heretofore, in agricultural tractors steel cleats and lugs were used to obtain traction. The early tractors were of comparatively slow speed and very heavy. With this great weight, if the tractor was able to go at all, only comparatively shallow cleats or lugs were necessary. With the advent of the high-speed and more efficient engines, the tractors were made much lighter and in order to deliver a reasonable percentage of the available horsepower at the drawbar, it has heretofore been necessary to increase the height of the steel lugs, which rely chiefly upon the sub-soil for traction. Since the lugs of the wheel act similar to gear teeth, the speeds of all the points at different distances from the axis of rotation are different and consequently there is an equivalent pitch diameter, the points of which have a peripheral speed equal to the forward motion of the tractor, assuming there is no slipping of the wheels. The longer the lugs and the greater the depth of penetration into the ground, the greater is the difference in speeds of the points on the lugs which penetrate the ground. This causes a "spading" action of the lugs due to the change of the angle of lugs as they enter and leave the ground, and dissipates considerable energy from the motor and thereby increases the effective rolling resistance of the tractor.

The present invention provides a pneumatic tire tread having a lower rolling resistance, which at the same time has an increased traction ability. The construction and arrangement of the present tread is such that the effective pitch diameter is adjacent the outer extremities of the tread configuration and also such that the shearing resistance of the upper surface of the loose soil is relied upon to obtain increased traction, whereby less power is dissipated through the traction device.

The predominating factors affording traction to a wheel or tire in loose mediums, such as the various kinds of soils, are different from those controlling traction on hard surfaces. In the latter, the main factor is the friction between the wheel or tire surface and the road surface, while in the former where the medium is deformable, it is almost impossible under the conditions under which agricultural tractors must frequently operate, to obtain sufficient frictional resistance between the ground and tire which will produce any substantial tractive effort. The present invention utilizes the friction between areas of the surface soil on which the downward thrust of the tractor weight and the drawbar pull are such that there is a "crust" or "track" formed, with which the lugs on the tire engage or mesh to obtain traction. It was common heretofore in tires designed to operate on hard surfaces, to provide a configuration having numerous readily deformable edges which increase the friction between the tire and the hard surface. Such treats are ineffective on loose or soft ground, since the frictional resistance is very low. Due to the fact that the portion of the tire which is in contact with the ground at one time is very limited, if the area of the projections is large as compared to the area of the intervening grooves or recesses, the available traction is dependent upon the friction between the configurations and the loose ground, and the shearing resistance of the ground which enters the intervening recesses is substantially ineffective because the "matrix" of the ground is so broken up and disturbed that there is no united action in resisting shearing. The small intervening recesses cause the tread configuration to act similar to the teeth of a saw, whereby slipping of the tire digs out and displaces the ground without obtaining any substantial traction. Under such conditions, the tire will dig farther and farther into the ground when the soil is loose or wet, and the tractor will become mired.

According to the present invention an improved traction tire is provided which is so designed that the inherent tendency of the tire to slip relatively of the soil when pulling causes the soil to be compacted in order to obtain greater shearing resistance. Furthermore, the present invention provides a pneumatic tire tread configuration in which the tendency of the traction elements to become filled with the loose and sticky soil is reduced by the normal resiliency, contour and the rolling of the tire.

A major object of the invention, therefore, is to provide an improved resilient tire tread having a tread configuration that affords improved traction in a deformable or compactible medium.

Another object is to provide an improved tire tread in which the tractive force is utilized to increase the shearing resistance of the soil in which the tire is operating.

Another object is to provide an improved pneumatic traction tire in which the tread bars are so shaped and arranged that under slight slippage due to tractive effort the laterally directed components of tractive effort increase the shearing resistance of the soil at the lateral marginal portions of the tire tread as well as on the circumferential portion thereof.

Another object is to provide an improved pneumatic traction tire in which the laterally directed components of force due to slight slippage under tractive effort are substantially in equilibrium.

Another object is to provide an improved traction tire having a plurality of lug formations so constructed and arranged that during operation of the tire the lugs will be subjected to a minimum of wiping action.

Another object is to provide an improved pneumatic tire having a plurality of rib formations having an outline, which when projected on a plane transverse of the tire, has a single radius of curvature.

Another object is to provide an improved traction tire having a plurality of circumferentially spaced rib formations which are concave in a common general direction along the circumference of the tire.

A further object of the invention is to provide a pneumatic traction tire having, in combination, a carcass with an arcuate transverse cross section and a tread portion, having an arcuate profile which smoothly blends into the carcass, the tread portion including a series of curved ribs extending transversely inwardly of the tire from each side thereof, all ribs being concave in a generally common direction along the circumference of the tire, and the ribs of each series being eccentrically arranged with respect to each other so that the circumferential spacing between adjacent bars of any one series, as long as such bars have substantially maximum height, progressively increases toward the sides of the tire, whereby lateral extrusion of deformable earth, etc., is facilitated.

Another object is to provide a pneumatic traction tire having a plurality of curved rib formations which place a large volume of rubber in the center plane of the tire and which may progressively increase in depth toward the center of the tire. Still a further object is to provide a pneumatic traction tire having a minimum area of tread, which tread is composed of elements having relatively greater spacing than previous types of treads and which tread is adapted to penetrate soft soils, sod, cover crops or the like.

Other and further objects will become readily apparent from the following description, when considered in connection with the accompanying drawings in which:

Figure 1 is a perspective view of a pneumatic tire embodying the present invention;

Figure 2 is an enlarged transverse section along line 2—2 of Figure 1;

Figure 3 is a partial vertical section on the line 3—3 of Figure 1;

Figure 4 is a partial vertical section on line 4—4 of Figure 1;

Figure 6 is a plan view of a flat section of a modification of the invention.

Figure 5:
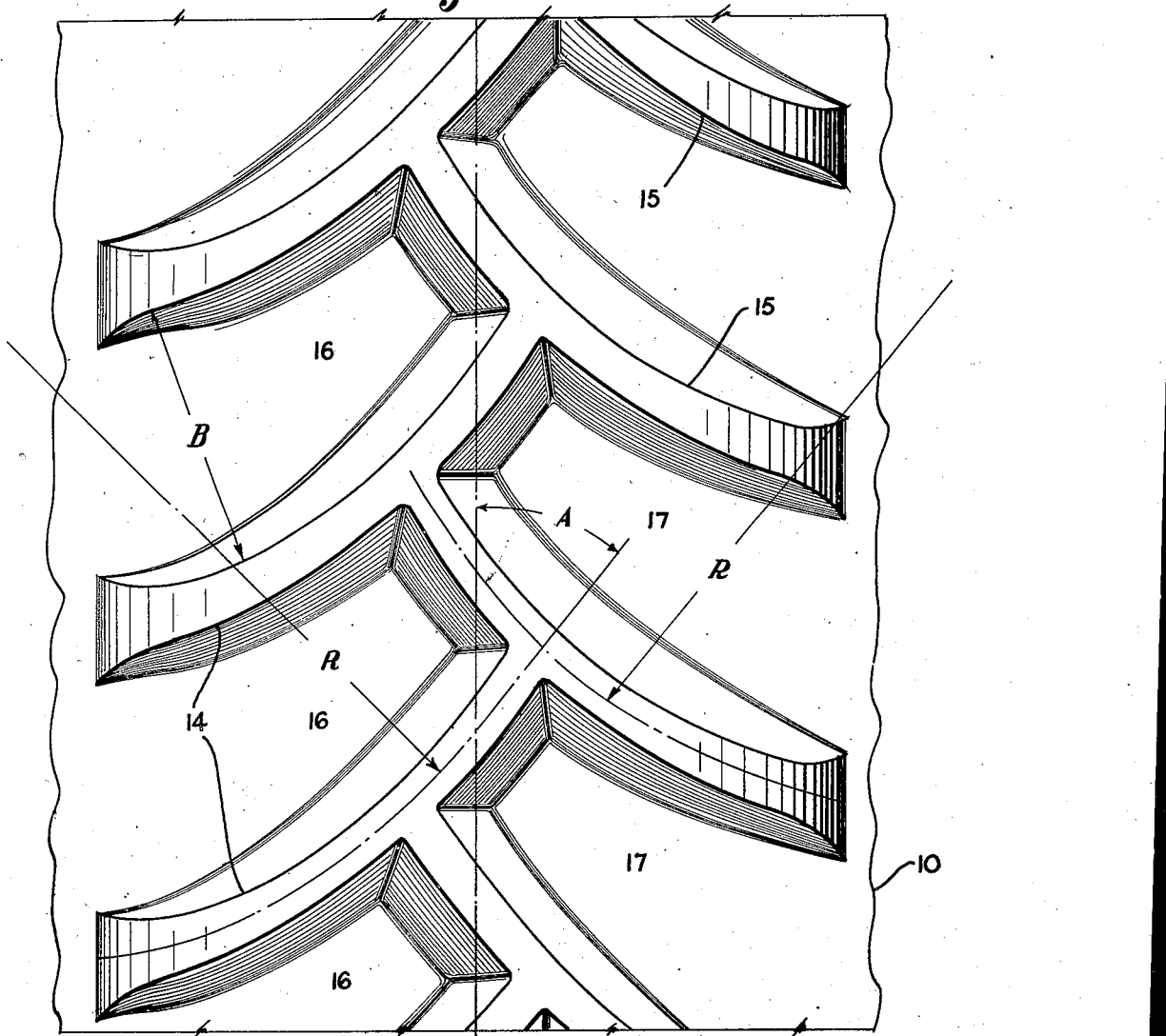
Figure 5 is a plan view of a flat section of the tire of the invention.

The present invention contemplates an improved pneumatic tire particularly adapted for use on agricultural vehicles where the vehicle must develop a large horizontal tractive force as compared to the weight of the vehicle, when operating over soft or loose soil. The present construction provides a tire tread having a greater self-cleaning action and increased traction with a minimum of rubber. This primary object is accomplished by positioning the material of the traction elements in such a manner that when the tire is under load there will be a minimum of localized movement of parts of the tread relatively of the main body of the tire, as the tire deflects in coming into contact with and leaving the ground.

The basic concept of the invention is to provide a plurality of curved, circumferentially spaced ribs arranged eccentrically with relation to each other and with the concavity of all the ribs in the general direction of rotation of the tire for maximum desired traction. Preferably the traction elements are of progressively increasing depth from the sides of the tire toward the center line thereof.

Referring to the drawings, an embodiment of the invention is shown in the form of a tire 10 having the usual carcass 12 and tread 13. As illustrated in the drawings, the tread has a traction portion made up of two circumferential series of curved rib formations 14 and 15. The ribs of each series are circumferentially spaced by intervening grooves, or valleys 16 and 17, respectively.

The ribs 14 and 15 are identical and are tapered radially and filleted at the base as indicated at 18 in Figure 4. In the embodiment shown, the ribs 14 of the one series extend in from one side of the tire across the center line thereof, where their transversely inner portions circumferentially overlap the inner portions of the ribs 15 of the other series. The inner ends of the ribs of one series may be connected to a rib of the other series at a point intermediate the ends of the latter, as shown. Such connection provides reinforcement for both ribs against bending when the tire is pulling or is subjected to tangential forces. However, in some cases, the ribs of one series may stop short of the ribs of the other series. All of the inner ends of the ribs 14 and 15 are substantially parallel to the central plane of the tire to concentrate tread area in such region. Note that the angle "A" in Figure 5 is appreciably less than 45°, which is the angle formed by tread elements in previously known constructions. All of the valleys 16 and 17 are open to the transverse edges of the tire and an important feature of the invention is that the valleys 16 and 17 all progressively increase in width with increase in distance from the rib junction defining the closed end of the rib, as long as the ribs have substantially maximum height or are in the radially outer (load carrying) portion of the tire. Such a construction greatly facilitates a self-cleaning action of the valley and, in general, prevents soil from wedging in, or sticking to, the tire tread after the tread lifts from contact with same.

All of the ribs 14 and 15 are concave in a common direction along the circumference of the tire, with the ribs of each series being eccentrically arranged with respect to each other, so that the circumferential spacing between the adjacent ribs of any one series progressively increases towards the side of the tire. Figure 2 best shows that the ribs of one series smoothly combine with the ribs of the other series to form a smooth, arcuate periphery for the traction elements, the ends of which smoothly blend in with the side wall of the tire carcass, as best seen in Figure 2. While the ribs have the same width throughout their entire effective length, they may increase slightly in height, as shown, as they extend towards the center plane of the tire, so that the maximum amount of rubber is present in the traction element in the portion thereof subject to maximum wear. The dimension "B" on Figure 5 indicates the point at which adjacent ribs of one series are furthest spaced. The arrangement of the ribs is such, as seen in Figure 5, that a more or less continuous zig-zag central rib, which repeatedly intersects the centerline of the tire, is formed by the circumferentially overlapping tread elements whereby the tire is smooth running, even on hard surfaces, only a minimum of tread impact occurs, and the tread wears substantially uniformly. This construction also minimizes any wiping action of the ribs under load. Note that all of the traction elements, especially in the central plane of the tire are appreciably higher, or extend farther from the tire carcass, than the width, or transverse dimension of the ribs at the top thereof in order to dig into the deformable medium in which the tire primarily is used. The spacing of the tread ribs also facilitates the tread digging into and obtaining traction in a soft soil.

Figure 5 indicates that the adjacent ribs of one series extend slightly closer to each other at the free ends thereof than at the remaining portions of the ribs. This is not detrimental, because such decreased dimension occurs only where the ribs start to blend in with the sidewalls and where the ribs have low height. Hence, substantially all of the valleys in the portion of the tire usually in contact with the soil do gradually increase in width toward the open ends thereof. The ribs on the outer periphery of the tire noticeably separate with increased distance from the center plane of the tire.

Figure 6 shows a modified tread arrangement of the invention, wherein again two series of traction elements, or ribs 14a and 15a are formed in the tread body. However, in this instance, alternate members of each rib series are appreciably smaller than the other rib elements and the small ribs extend to the center line of the tire, and abut a longer rib from the other rib series. The construction of the modified tread form of Figure 6 is generally similar to that of the other figures of the drawings, except for the fact that certain rib elements are shortened, as indicated hereinabove. Further, it is seen that two ribs of one series butt against, or brace the longer ribs of the opposed rib series, whereas in the other embodiment of the invention one rib of each series butts against or braces one rib of the opposed series. It will be noted that in all embodiments of the invention the traction elements are in staggered circumferential relation and that they all extend in the same general direction.

It will be observed that the preferred, or the desired direction of rotation of each of the tires of the invention is such that the tractive forces are exerted on the concave faces of the rib elements and then the ribs are more resistant to deflection, due to the curvature thereof than correspondingly formed straight rib elements, whereby the volume of rubber in the ribs may either be decreased without impairing the efficiency of the tire, or else the same volume of rubber may be used to give a tire having ribs of increased strength over standard constructions.

The invention is not limited to the specific embodiments illustrated and described herein, but is limited solely by the scope of the appended claims.

What is claimed is:

1. A pneumatic tire having a transversely arcuate body portion and a tread with integral outwardly extending traction elements adapted to provide traction in a deformable medium, said traction elements comprising two series of integrally connected curved ribs, the ribs of each series being inclined with relation to the ribs of the other series and to the central plane of the tire in such a manner that the central portions of the ribs are circumferentially spaced, the height of said ribs at the center plane of the tire being at least as great as the width thereof at the top of the rib, all of said ribs having the same radius of curvature, said ribs having valleys formed therebetween which are open to the sides of the tire and said ribs being formed so that the valleys increase in width and decrease in depth from the center of the tread substantially to the open ends of said valleys.

2. A pneumatic tire tread construction primarily for use in easily deformable mediums, said tread comprising two sets of converging ribs, the ribs of each set having valleys therebetween which are open to the sides of the tire, said valleys extending at opposite angles to the centerline of the tire, all of the ribs of each set being mainly on the same side of the tread and all of the ribs of both sets being curved and forming arcs of the same radius of curvature, said valleys progressively increasing in width from the centerline of the tire toward the open ends of said valleys substantially to the transverse edges of the tire to facilitate an automatic self-cleaning action by the tread.

3. A pneumatic tire of the class described comprising a casing having a tread portion, said tread portion having traction elements in the form of elongated lugs arranged successively in circumferential series thereon and projecting outwardly therefrom, said lugs extending in an arcuate and obliquely transverse direction on said tread, each lug being projected from the longitudinally convex side of an adjoining lug, at least some of said lugs extending from the sidewall of the tire to and beyond the said median plane of said tire said ribs defining grooves therebetween which are progressively widened from the center of said tread portion substantially to the sidewalls, the ends of said grooves at the sidewalls being open.

4. A pneumatic tire for use on motor vehicles operating in soft, muddy soil, comprising a casing having a tread portion, said tread portion having two series of traction elements in the form of outwardly projecting, laterally extending, elongated lugs, arranged successively in circumferentially spaced relation with the lugs of the same series and defining grooves between said lugs, said projection of said lugs being greatest at the center of said tread and gradually decreasing toward the outer end of the lugs so that said outer ends merge with the side-walls of the tire, said elongated lugs extending in an arcuate and transverse direction on said tread, each lug being projected from the longitudinal convex side of an adjoining lug at an angle of substantially less than 45, with the median plane of the tire, at least some of said lugs of each of said series extending from the sidewall of the tire to and beyond said median plane, said grooves having closed inner and open outer ends, said grooves progressively increasing in width from the center of said tread portion substantially throughout their length and decreasing in depth toward their open ends.

5. A pneumatic tire for use on motor vehicles operating in soft, muddy soil, comprising a casing having a tread portion, said tread portion having two series of traction elements in the form of outwardly projecting, laterally extending, elongated lugs, arranged successively in circumferentially spaced relation with the lugs of the same series and defining grooves between said lugs, said projection of said lugs being greatest at the center of said tread and gradually decreasing toward the outer end of the lugs so that said outer ends merge with the side-walls of the tire, said lugs having a transverse section that tapers from its base to a flat top, said top being of uniform width throughout the greater length of the lugs, said top flaring circumferentially of the tire at the end of the lugs, said elongated lugs extending in an arcuate and transverse direction on said tread, each lug being projected from the longitudinal convex side of an adjoining lug at an angle of substantially less than 45° with the median plane of the tire, at least some of said lugs of each of said series extending from the sidewall of the tire to and beyond said median plane, said grooves having closed inner and open outer ends, said grooves progressively increasing in width from the center of said tread portion substantially throughout their length and decreasing in depth toward their open ends.

WILLIAM S. COBEN.